United States Patent [19]

Shoureshi

[11] Patent Number: 5,629,986
[45] Date of Patent: May 13, 1997

[54] METHOD AND APPARATUS FOR INTELLIGENT ACTIVE AND SEMI-ACTIVE VIBRATION CONTROL

[75] Inventor: Rahmat Shoureshi, West Lafayette, Ind.

[73] Assignee: Cooper Tire & Rubber Company, Findlay, Ohio

[21] Appl. No.: 445,647

[22] Filed: May 22, 1995

Related U.S. Application Data

[63] Continuation of Ser. No. 273,377, Jul. 11, 1994, Pat. No. 5,418,858.

[51] Int. Cl.$^6$ .............................. A61F 11/06; H04B 15/00
[52] U.S. Cl. .................................. 381/71; 381/94
[58] Field of Search ........................ 381/71, 94

[56] References Cited

U.S. PATENT DOCUMENTS

| | | | |
|---|---|---|---|
| 4,122,303 | 10/1978 | Chaplin | 381/71 |
| 4,153,815 | 5/1979 | Chaplin et al. | 381/71 |
| 4,417,098 | 11/1983 | Chaplin | 381/94 |
| 4,473,906 | 9/1984 | Warnaka et al. | 381/71 |
| 4,477,505 | 10/1984 | Warnaka | 428/160 |
| 4,489,441 | 12/1984 | Chaplin | 381/71 |
| 4,490,841 | 12/1984 | Chaplin et al. | 381/71 |
| 4,506,380 | 3/1985 | Matsui | 381/71 |
| 4,527,282 | 7/1985 | Chaplin et al. | 381/71 |
| 4,562,589 | 12/1985 | Warnaka et al. | 381/71 |
| 4,566,118 | 1/1986 | Chaplin et al. | 381/71 |
| 4,600,863 | 7/1986 | Chaplin et al. | 381/71 |
| 4,649,505 | 3/1987 | Zinser, Jr. | 379/411 |
| 4,654,871 | 3/1987 | Chaplin et al. | 381/72 |
| 4,677,676 | 6/1987 | Eriksson | 381/71 |
| 4,677,677 | 6/1987 | Eriksson | 381/71 |
| 4,862,506 | 8/1989 | Landgarten et al. | 381/71 |
| 4,947,435 | 8/1990 | Taylor | 381/71 |
| 5,022,082 | 6/1991 | Eriksson et al. | 381/71 |
| 5,039,073 | 8/1991 | Reichard et al. | 267/140.1 |
| 5,052,529 | 10/1991 | Sutcliffe | 188/378 |
| 5,245,664 | 9/1993 | Kinoshite et al. | 381/71 |
| 5,418,858 | 5/1995 | Shoureshi | 381/71 |

OTHER PUBLICATIONS

"A Multiple Error LMS Algorithm and Its Application to the Active Control of Sound and Vibration", Elliott Strothers, Nelson IEEE Transaction on Acoustics, Speech and Signal Proc. vol. ASSP-33 No. 10 Oct. 1987.

"A Unified Control Strategy for the Active Reduction of Sound and Vibration; Doelman"; Journal of Intelligant Material Systems and Structures; vol. 2 No. 4, pp. 555-580; Oct. 91.

Application of Self-Tuning Control Strategies to the Active Reduction of Sound; Doelman, Doppenberg; International Conference on Control 91; vol. 1, pp. 121-126.

(List continued on next page.)

Primary Examiner—Edward L. Coles, Sr.
Assistant Examiner—Jerome Grant, II
Attorney, Agent, or Firm—Joseph G. Nauman

[57] ABSTRACT

A generalized minimum variance type of control operates on combined optimal and self-tuning control theorems, and is applicable to the design of active, semi-active, and hybrid vibration control systems. The system operates in a multiple-input/multiple- output manner, so when both noise and vibration are important, e.g. interior of a vehicle, the resulting nulling signal will be based on diminishing both vibrations and noise. The system operates by directly nulling primary vibrations in an active mode, and/or by developing a variable bandwidth mechanical filter, in a semi-active mode, and applying nulling signals accordingly to the vibration source. Artificial intelligence is incorporated into the system to learn on-line the dynamics of the system, e.g. vehicle modal parameters, without reprogramming or tuning the system. Software resident in memory includes a first program a modal extraction of vibration and/or noise from the sensors, to perform a minimum variance calculation based on recorded past performance and on fuzzy logic compensation. Output signals generated and applied to actuators minimize and/or filter the vibration or noise.

10 Claims, 8 Drawing Sheets

OTHER PUBLICATIONS

Active Attenuation of Noise–The State of the Art; Warnaka; Noise Control Engineering, May–Jun. 1986; pp. 100–110
Active Noise Reduction Systems in Ducts; Tichy; Warnaka, Poole ASMF 89–WA/NCA–15.

Active Control of Commerical Vehicle Exhaust Noise; Tinder, Chaplin, Nelson; Inter–Noise Jul. 1986 pp. 611–616.

The Cancellation of Repetitive Noise and Vibration; Chaplin; Inter–Noise Dec 1980.

METHOD AND APPARATUS FOR INTELLIGENT ACTIVE AND SEMI-ACTIVE VIBRATION CONTROL

CROSS-REFERENCE TO RELATED APPLICATION

This application is a continuation of application Ser. No. 08/273,377 filed 11 Jul. 1994, now U.S. Pat. No. 5,418,858 issued 23 May 1995. The term of any patent issued from this application is disclaimed beyond 11 Jul. 2012.

FIELD OF THE INVENTION

This invention relates to methods and apparatus for cancelling and/or minimizing vibrations, including the nulling of primary vibrations and the cancellation of repetitive or random vibrations, using a control signal which is applied through a variety of actuation sources, e.g. electromagnetic, hydraulic, pneumatic, or materials which change condition in response to some stimulus.

BACKGROUND OF THE INVENTION

One system, and variations thereof, for cancelling vibrations has been proposed in which the vibration is sensed via an appropriate pick-up, and a cancellation signal is created which is a 180° phase shift of the sensed signal. The cancellation signal is applied to or near the vibration source, thereby cancelling or at least greatly attenuating the vibration source. U.S. patents disclosing such a system are U.S. Pat. Nos. 4,153,815, 4,417,098, 4,489,441, and 4,566,118.

Such systems are based on adaptive signal processing techniques which may result in an inherent instability which could amplify rather than attenuate the vibration. Also, such systems require a direct measurement of a synchronizing signal which provides them directly with the value of the frequency of the excitation source (vibration). Those systems operate on the basis of synthesizing the vibration source signal, synchronizing it with the excitation signal, then delaying such signal to achieve a 180° phase difference and applying it to cancel the effect of the excitation source. This results in a high sensitivity and potentially unstable vibration cancellation due to exact phasing needs.

U.S. Pat. Nos. 4,122,203; 4,153,815; 4,417,098; 4,490,841; 4,527,282; 4,566,118; 4,600,863; and 4,654,871 disclose the work of G. B. Chaplin in the area of repetitive phenomena. The active noise control systems disclosed therein are designed for one-dimensional systems, and all approaches described require some type of "synchronizing" signal. Thus, those systems require some type of sensor linked directly to the excitation source. Those systems cannot be used for random vibration or noise sources. They require a relatively long processing time, and are directed predominantly to acoustic systems, and do not appear to relate to active vibration control.

U.S. Pat. Nos. 4,473,906 and 4,562,589 (Warneka) disclose a departure from the systems disclosed in the aforementioned Chaplin patents, relating to use of a feedforward control signal. The techniques disclosed require a direct measurement from the noise or vibration source, after which this signal is inverted and used to cancel the detected noise or vibration. Using a feedforward signal allows attenuation of random excitations, but these systems again require a direct measurement from the source and in many applications there is no direct access to the noise or vibration source.

U.S. Pat. Nos. 4,667,676 and 4,667,677 disclose an approach based on adaptive filters (LMS and RLMS) and feedback signals to estimate the excitation source signal. The shortcomings of those systems are a) potential for instability, b) a need for a high degree of on-line processing, and c) use of only feedback signals which limits the system's application to broadband noise and vibrations. The disclosed systems have been mostly used in noise control systems.

U.S. Pat. Nos. 4,649,505 and 4,862,506 (Noise Control Technologies) appear to be based on hardware modifications of prior art, using adaptive filters (such as introduced by Widrow; 1960's), and using a LMS algorithm which does not guarantee controlled system stability.

Another system has been disclosed in which a source of vibration is monitored (sensed) and an attenuating signal is applied to or near the source. The attenuating signal is modified in opposition to changes sensed at the vibration source, until the combination of the two results in cancellation of the vibration, or attenuation thereof to some predetermined level. No phase-shifted attenuating signal is employed. Systems of this type are disclosed in a paper entitled "A Multiple Error LMS Algorithm and Its Application to the Active Control of Sound and Vibration" by Stephen J. Elliott, Ian M. Strothers & Philip A. Nelson, IEEE Transactions on Acoustics, Speech and Signal Processing, Vol. ASSP-33 No. 10, October 1987, and in a paper entitled "A Unified Control Strategy for the Active Reduction of Sound and Vibration" by N. J. Doelman, Journal of Intelligent Material Systems and Structures, Vol. 2 No. 4, pages 558–580, October 1991.

Further, previously proposed vibration control schemes require a fast Fourier Transform (FFT) analyzer, which adds significantly to the cost of the system and/or increases the amount of on-line computation.

SUMMARY OF THE INVENTION

The present invention is an improvement on the generalized minimum variance (GMV) type of control such as exemplified by the Doelman paper. The invention operates on the basis of combined optimal and self-tuning control theorems, and is applicable to the design of active, semi-active, and hybrid vibration control systems. This system operates in a multiple-input/multiple-output (MIMO) manner. Therefore, when both noise and vibration are important, e.g. interior of a vehicle, then the resulting nulling signal will be based on minimizing, or at least diminishing, both vibrations and noise. The system, that is the method and apparatus of the invention, operates by directly nulling primary vibrations, in an active mode, and/or by developing a variable bandwidth mechanical filter, in a semi-active mode, and applying nulling signals accordingly to the vibration source. Artificial intelligence is incorporated into the system to learn automatically, on-line, the dynamics of the system, such as vehicle modal parameters, and this intelligence is used to modify future decision making in the systems, based on results of past performance, without need for reprogramming or tuning of the system.

A vibration control system according to the invention incorporates digital electronic circuitry to convert acceleration and/or audio (microphone) signals into proper format for the software logic which resides in a microprocessor chip. This technique does not require a synchronizing signal, and can be implemented on inexpensive microprocessors.

The hardware used in an actual embodiment of the invention takes full advantage of state of the art high power microprocessors. It is capable of handling sixteen sensory input signals and generating eight output signals. Therefore, in the case of a noise and vibration control in a vehicle, it is possible to combine four audio (microphone) signals from the driver, passenger, and back seat areas, and accelerometer signals from different seat tracks, the steering column, and the floor pan. The resulting control signals to the vehicle can be two for adjustable front engine mounts, and six for the adjustable body (cradle) mounts. Thus, this hardware can take full advantage of available sensory information, and develop nulling signals for several actuators simultaneously.

The software used by the microprocessor in the present invention causes that processor to perform a number of steps (i.e. a cycle) according to programs which are developed from a set of algorithims and are resident in the system memory. The first program causes the system to perform a modal extraction of vibration and/or noise from the sensors. This step may not require repetition at the beginning of each cyclic operation, unless the system senses that the previous result was out of range. However, the modal extraction is on-line (interactive) and always available as part of the system over all performance. The next step is to perform a minimum variance calculation, then the following step performs an intelligent control calculation based on recorded past performance and on fuzzy logic compensation, to achieve parameter optimization, then an output signal or signals are generated and applied to appropriate actuators of the system to minimize and/or filter the vibration or noise introduced to the system from the structure being monitored and controlled.

Thus, the primary object of the invention is to provide a system perceiving (looking at) the effects of vibration or noise, and seeking to determine the dominant frequency or frequencies in such effect, then functioning to minimize that effect. This approach reduces cost and complexity of the system, and thus is more practical for an on-board type of control system as in a vehicle, as well as in other uses.

The on board microprocessor repeatedly runs the routines of the system cycle when the vehicle (or other controlled apparatus) is active. Results (e.g. nulling signals) of each cycle are stored to provide a source of information for the intelligence routine, while the modal extraction routine can be omitted from the system cycle if results are within range.

Other objects and advantages of the invention will be apparent from the following detailed description, the accompanying drawings, and the appended claims.

DESCRIPTION OF THE PREFERRED EMBODIMENT

Figure 1:
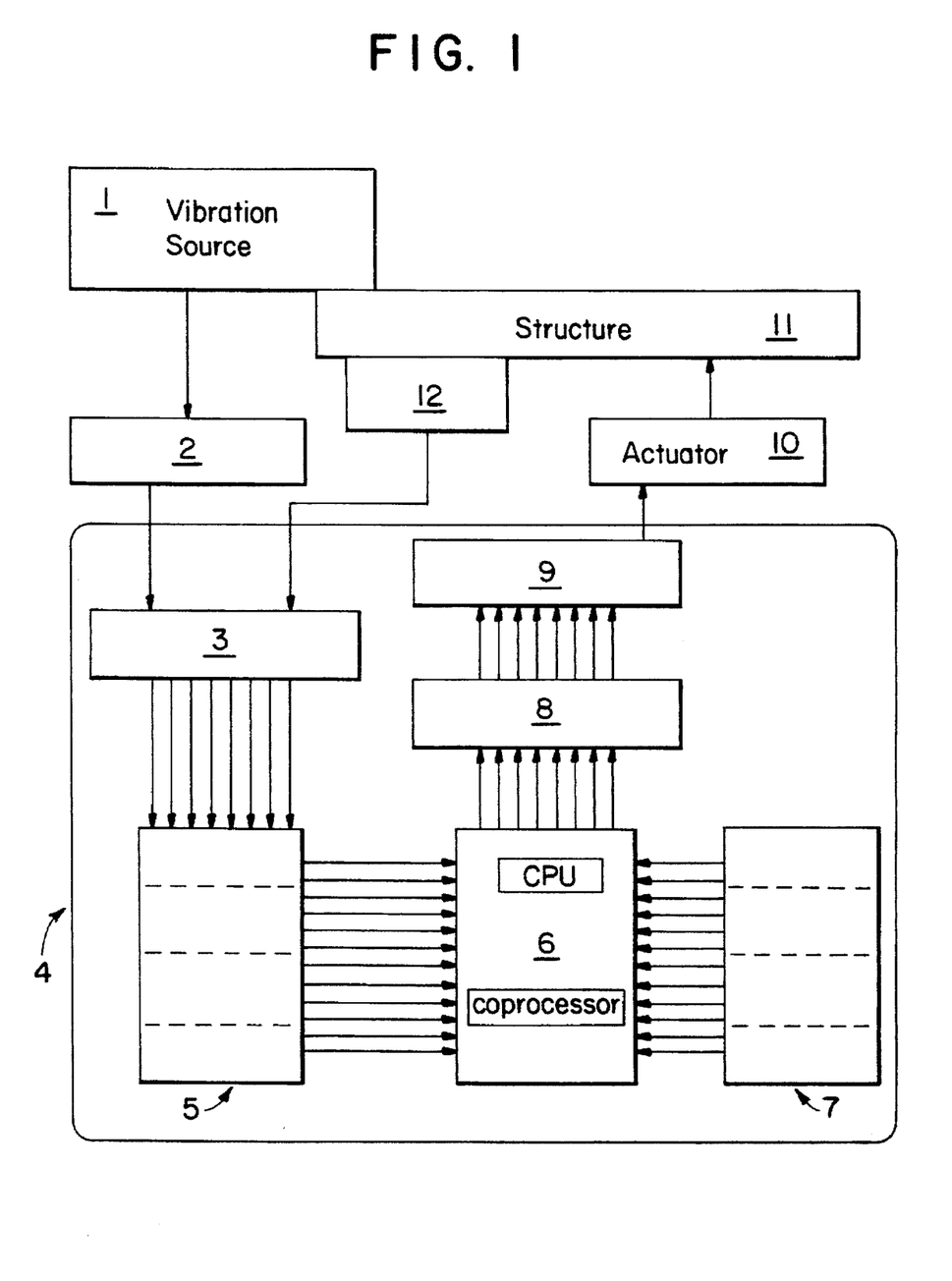
FIG. 1 is a schematic diagram of the general layout of a vibration and noise control system constructed according to the invention and applied to an automotive vehicle, and employing several sensors and actuators coupled to a multi-input, multi-output intelligent controller.
Figure 2:
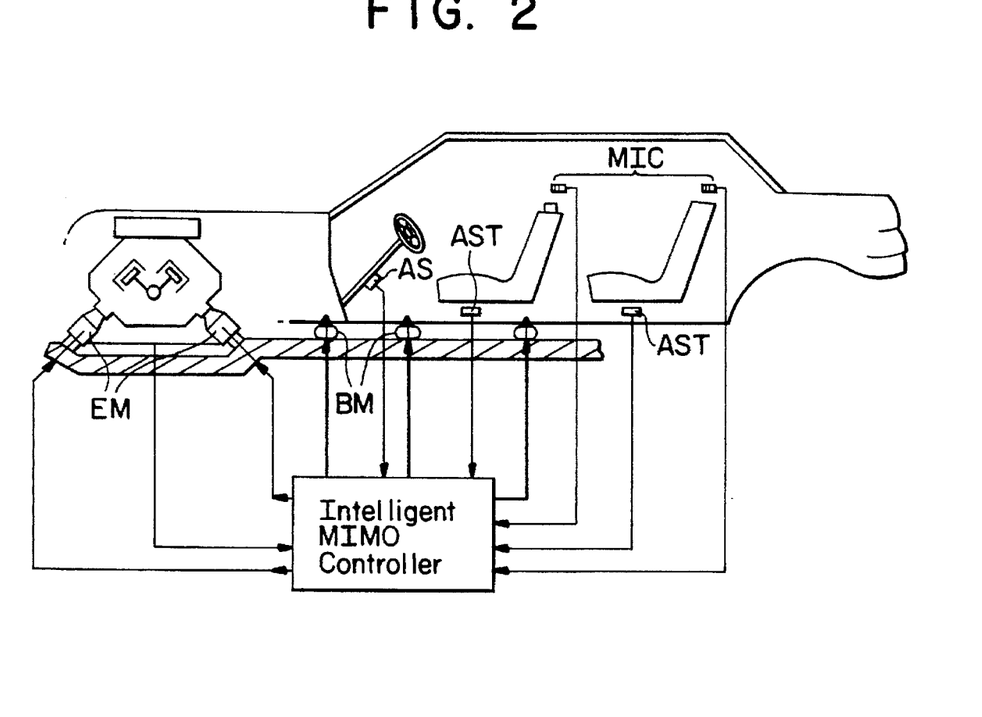
FIG. 2 shows a specific embodiment of the invention as applied to an automotive installation and employing a multi-input/multi-output controller using several sensors and actuators.

FIG. 1 shows in schematic diagram a vibration control system constructed according to the invention, in which a vibration source 1 (which may be a vehicle engine, a portable generator, an appliance motor, etc.) generates vibration waves. In the general diagram (FIG. 1) 11 denotes the structure to which the system is applied, and to which the vibration is input. FIG. 2 is a diagram of a specific embodiment of the invention for control of noise and vibration in the compartment of a vehicle. In both these general and specific embodiments, a sensor 2 (typically an accelerometer, a force transducer, a tachometer, a displacement sensor, a microphone) is located near source 1 to sense the vibration. There may be multiple sensors of different types, as hereinafter explained with respect to FIG. 2. The output of sensor 2 is fed into an analog signal converter/conditioning module 3 (see FIG. 3 for board details). If sensor 2 produces an analog signal, such signal is converted into digital form by module 3; if the sensor output is a digital signal, such signal is filtered by module 3 for aliasing.

Figure 3:
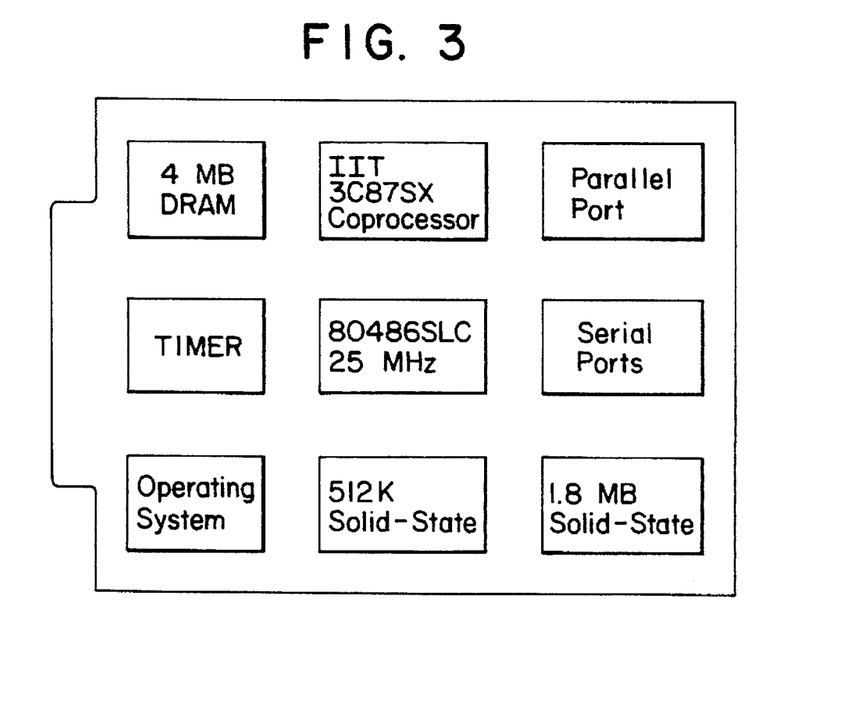
FIGS. 3, 4 and 5 are diagrams showing the design of circuit boards, including components as identified, which are used in an on-board vehicle installation such as shown in FIG. 2.
Figure 4:
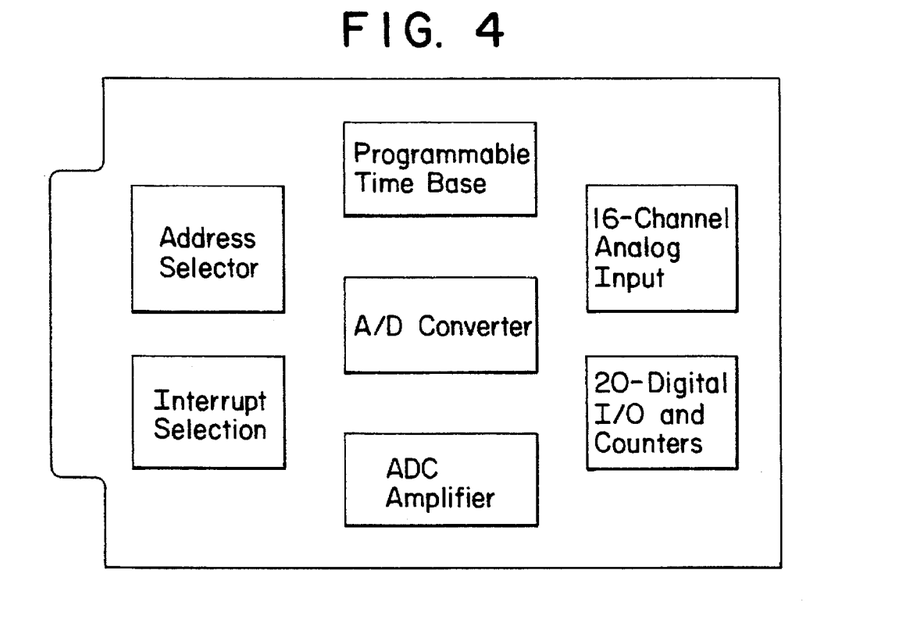
Figure 5:
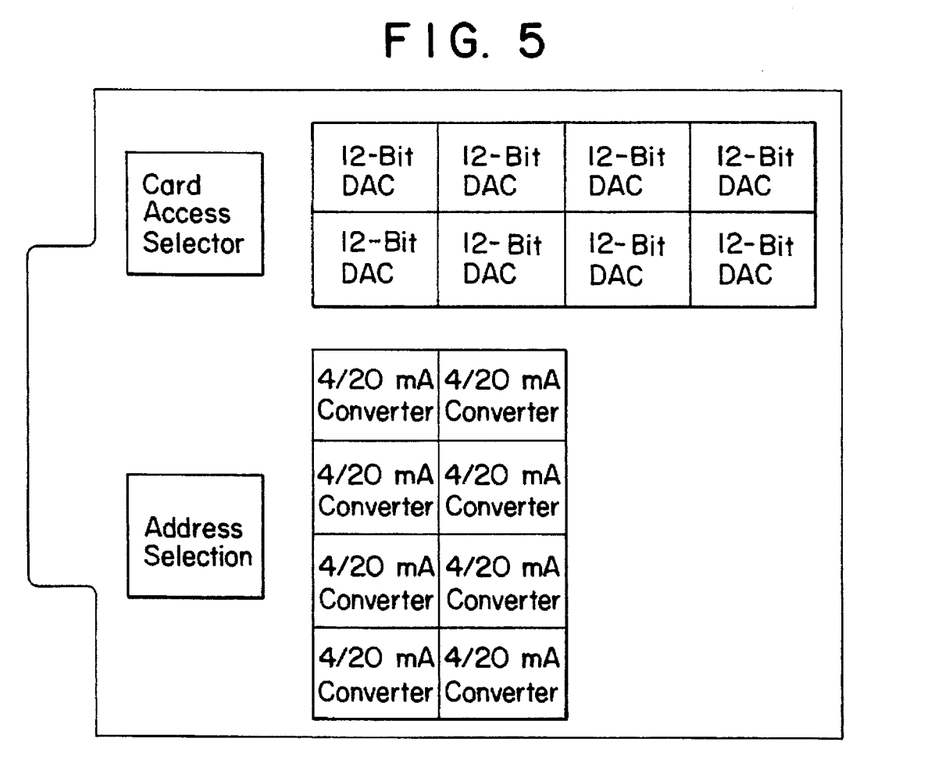
Figure 6:
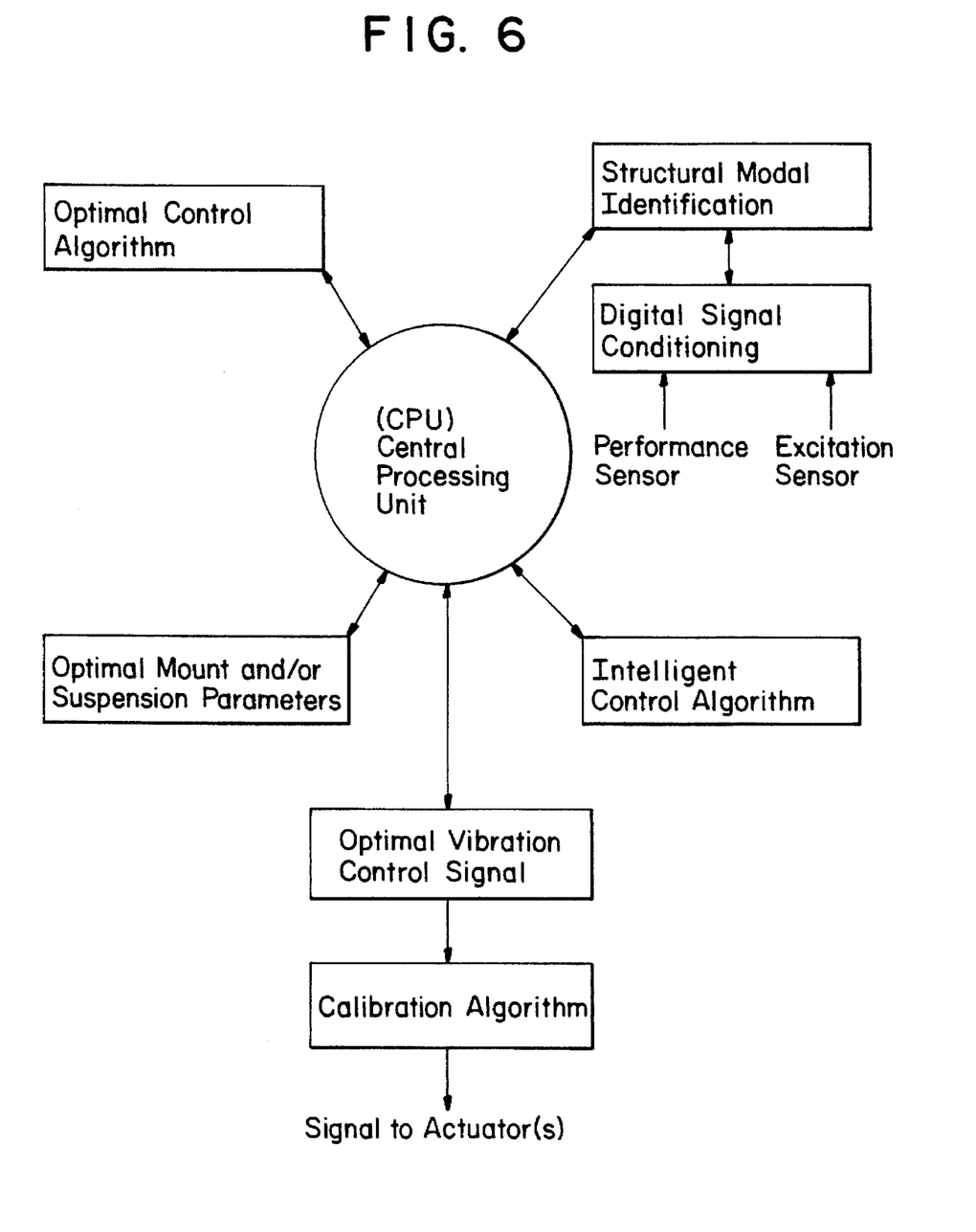
FIG. 6 is a diagram showing the relation of the central processing unit of the apparatus with various inputs and outputs, including resource algorithims, input and feedback devices, and output signals to actuators driven by the system.

The resulting digital output signal from module 3 is fed to the on-board memory 5 of a microcontroller 4, and resides in its appropriate memory bank with proper time index. Data sets stored in memory 5 are accessed by the central microprocessing unit 6 which comprises a CPU and a coprocessor capable of performing floating point arithmetic. It is possible to substitute a digital signal processing chip (DSP) for the CPU and coprocessor of the processing unit. FIGS. 3, 4 and 5 show electronic circuit boards and their components, which are per se known, used in conjunction with the microcontroller; their place in the system is indicated in FIG. 1. The major control algorithms of the system are stored in a ROM section 7 of the microcontroller 4. Such algorithms include (see FIG. 6) structural modal identification, optimal control, intelligent control, and optimal mount/suspension design algorithms in the case of an automotive mount control system.

After data manipulation, the CPU will generate an appropriate control signal, which is sent through a calibration module 8, to derive appropriate actuator signals depending upon whether an active or semi-active vibration control is desired. The resulting digital output signal is transmitted to an output port 9, converted to an analog signal, and then sent to one or more actuators 10. The active or semi-active actuators 10 will drive the structure (e.g. an adjustable engine mount EM (FIG. 2) or an adjustable suspension component, e.g. body mounts BM in FIG. 2) in such manner as to attenuate the vibration. A further sensor 12 provides a feedback signal to the microcontroller unit 4.

By way of example, the control system can include three small electronic circuit boards. The first board (see FIG. 3) houses the microprocessor or CPU, an on-board memory, a timer, and the operating systems. The CPU may be an 80486SLC processor such as available from Cyrix or Texas Instruments, with a 25 MHz clock. There is 1 MB of on-board memory and a 256 Kbyte flash EPROM, along with 512 Kbyte of static RAM.

FIG. 4 is a schematic diagram of the 12-bit analog to digital (A-D) board, including sixteen input channels with ability to convert 70,000 samples per second. This board has three 16-bit counter/timers. There are nineteen digital I/O lines, arranged in three groups for different combinations of inputs (sensors accessed) and outputs (actuators receiving control signals). The sixteen input channels are more than what is typically required in an automotive system where both acoustic signals (e.g. microphones) and vibration signals (e.g. accelerometers) may be used.

The third electronic board in the control system is an eight channel digital to analog (D-A) output board (see FIG. 5). The analog voltages are generated on this board, thus only 5V is needed for DAC operations. In a typical large size vehicle, e.g. a light truck or van, two engine mounts and six body mounts may need to be controlled simultaneously, thus eight-channel DAC is provided for the controller.

Figure 11:
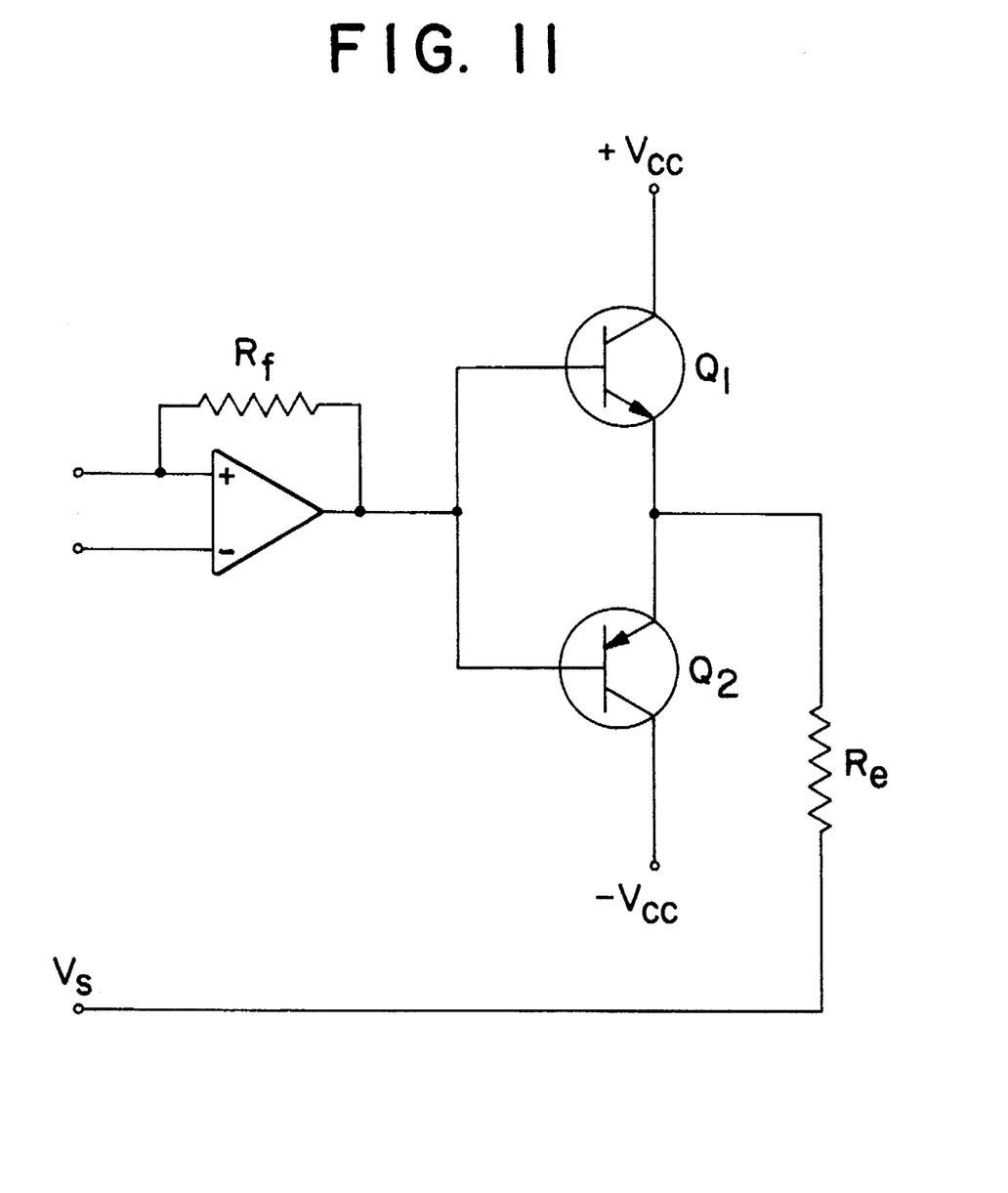
FIG. 11 is a diagram of a suitable power supply circuit for the system.

To simplify the power requirements of the control device, it is desirable to require only a positive power source. For example, in the case of the active engine mounts EM or body mounts BM, the logically available power source is the vehicle battery which (at least in the U.S.A.) provides +12V power with respect to ground. However, for an active vibration control system, the control signal will have both positive and negative polarities. Therefore, power sources of +/−V are required. To eliminate such requirement, an electronic circuit is provided as shown in FIG. 11.

This circuit comprises an operational amplifier AMP with a resistor feedback $R_{f1}$, two transistors $Q_1$ and $Q_2$, and a loading resistor $R_1$. The control signal generated by the microprocessor is introduced to the input of the operational amplifier. The power source, e.g. the vehicle battery, is connected to the input port $V_s$. Since the base terminals of $Q_1$ and $Q_2$ are connected to the microprocessor signal by the operational amplifier AMP, then $Q_1$ and $Q_2$ can function as a voltage source or a voltage sink, respectively. Therefore, the output terminals $+V_{cc}$ and $-V_{cc}$ will provide both a positive source and a negative source. This electronic circuitry can eliminate the need for positive and negative voltage supplies.

In the case of a noise and vibration control in a vehicle, it is possible to combine four audio (microphone) signals from the driver, passenger, and back seat areas microphones MIC, and accelerometer signals from different seat track accelerometers AST, the steering column accelerometer AS, and the floor pan. The resulting control signals to the vehicle can be two for adjustable front engine mounts EM, and six for the adjustable body (cradle) mounts BM. Thus, this hardware can take full advantage of available sensory information, and develop nulling signals for several actuators simultaneously.

A program has been compiled and successfully operated a system as disclosed, using Borland Turbo-C++ version 1.0 and an Octagon 486 stand-alone controller unit (CPU), according to the algorithims set forth hereinafter.

MODE IDENTIFICATION

Whenever a vibration source (e.g. an engine of a vehicle, or a motor of an electrical appliance) excites a structure such as the compartment (e.g. engine compartment or appliance housing) in which the source is supported, depending upon the frequency content of the excitation signal, one or more modes of the structure (e.g. the vehicle driven by the engine) will be in turn excited. The present invention includes a method of identifying all of such excited modes on-line, then feeding them to the controller and its algorithm.

A major departure of the present invention from prior art approaches and devices is that the method and apparatus of this invention can provide physically realizable representation of the structure being monitored and controlled. Prior art approaches assume a time series representation of a system in the form of an auto-regressive with exogenous (ARX) input, or an auto-regressive with moving average (ARMA) input, and with external input (ARMAX). Results of those approaches have no physical significance and cannot be related to the modal characteristics of the structure, e.g. automotive chassis bending mode or body flexural mode. Other mechanisms require a Fast Fourier Transform (FFT) analyzer to develop modal characteristics.

The present approach eliminates the need for FFT. Further, the method and apparatus of the present invention can easily handle multiple-input/multiple-output (MIMO) systems, using the resulting modal characteristics.

For example, as shown schematically in FIG. 2, in a vehicle force transducers provide input signals from engine mounts EM, adjustable body mounts BM, and noise input signals from microphones MIC, accelerometer AS from the steering column, and accelerometers AST from the seat tracks provide error signals. When the method of this invention is applied between the seat track and engine mount signals, a number of modes will be identified on an on-line (or interactive) basis. These will relate to the portion of the structure (e.g. the vehicle body) excited by engine vibrations. The modes identified from the engine mount signals and the steering column signal may have the steering column mode more predominant than those identified by the seat track signals or data. Thus the intelligent controller will use such interpretation to assure accurate representation and physically correct identification of the vehicle vibration modes.

The software program consists of four routines, namely (1) modal extraction, (2) generalized minimum variance, and intelligence, based on (3) learning ability which records and utilizes past performance information, and (4) fuzzy logic. A complete cycle of the system program uses all four routines in the aforesaid sequence. The first or modal extraction routine may be omitted from the cycle if the result of running the previous cycle is not out of range of the system.

MODAL EXTRACTION

As mentioned above, the present invention provides a method to identify all of the excited modes on-line, then feed them to the vibration control program which is stored according to the vibration control algorithm. This operation step may not need to be performed at the beginning of every system cycle, but this step is necessary if it is determined the previous result was out of range.

Figure 7:
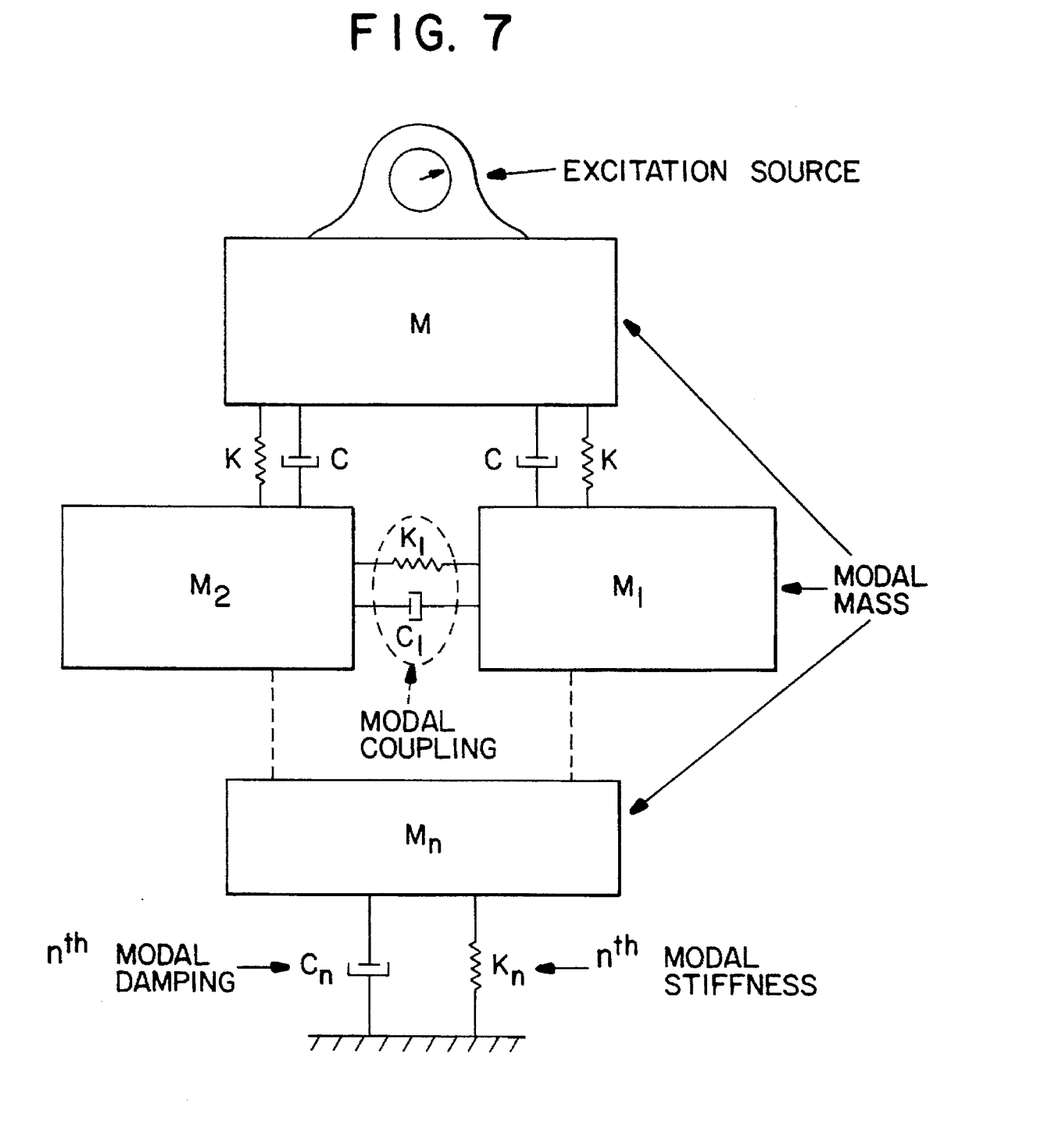
FIG. 7 is a diagram showing a modal representation of the system.

FIG. 7 is a pictorial presentation of a vibrating exciting structure which is comprised of several modes. Each mode can be represented by a transfer function as $$G(s) = \frac{\omega_n^2}{s^2 + 2\zeta\omega_n + \omega_n^2} \quad (1)$$

which in a discrete domain would be $$G(q) = \frac{b_1 q^{-1}}{1 + a_1 q^{-1} + a_2 q^{-2}} \quad (2)$$

-continued where $$b_1 = e^{-\zeta\omega_n T}\sin(\omega_n T\sqrt{1-\zeta^2})$$

$$a_1 = -2e^{-\zeta\omega_n T}\cos(\omega_n T\sqrt{1-\zeta^2})$$

$$a_2 = e^{-2\zeta\omega_n T}$$

and T is the sampling rate. Thus every mode is represented by three parameters $b_1$, $a_1$, and $a_2$. If these parameters are identified, then modal parameters can be obtained from the following equations.

$$\zeta = 1/\sqrt{1 + [2\tan^{-1}(2b_1/a_1)/\ln a_2]^2} \quad (3)$$

$$\omega_n = \frac{-\ln a_2}{2\zeta T} \quad (4)$$

Figure 8:
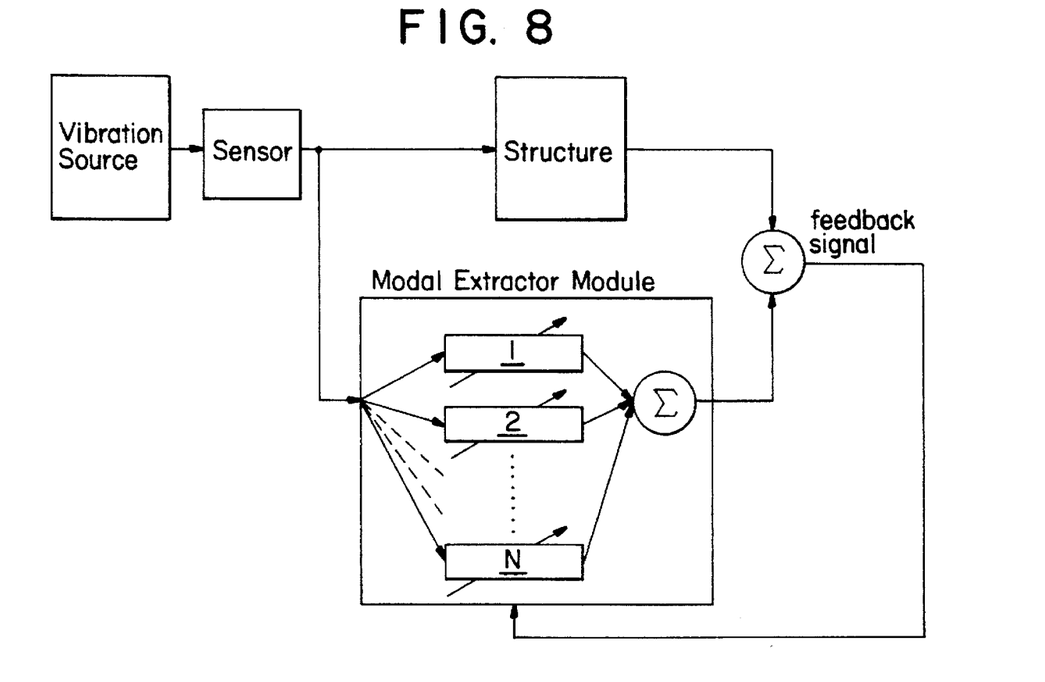
FIG. 8 is a diagram illustrating the extraction of structural modes from the system.
Figure 9:
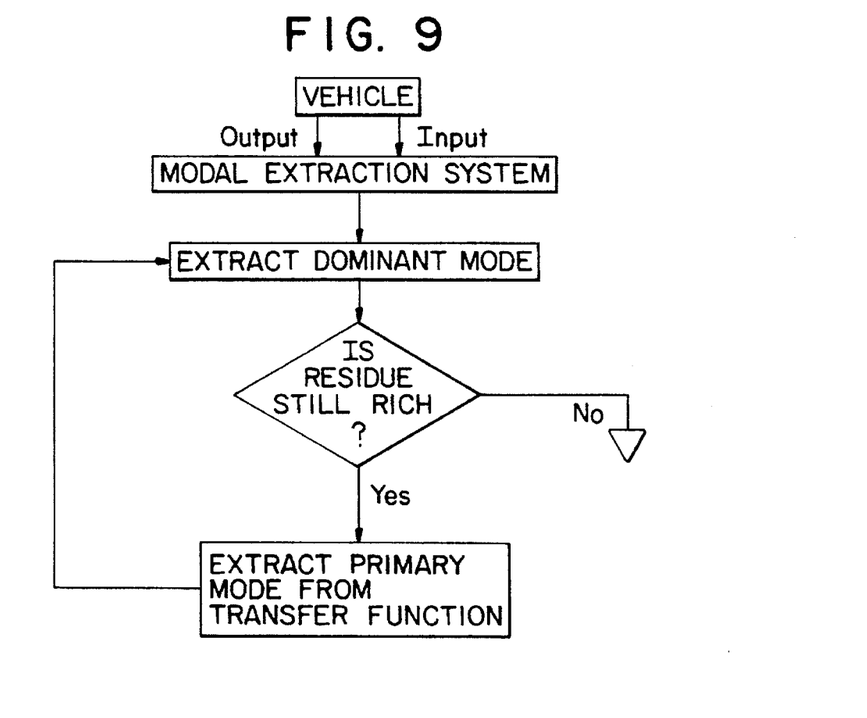
FIG. 9 is a block diagram of the logic of the system of the invention.
Figure 10:
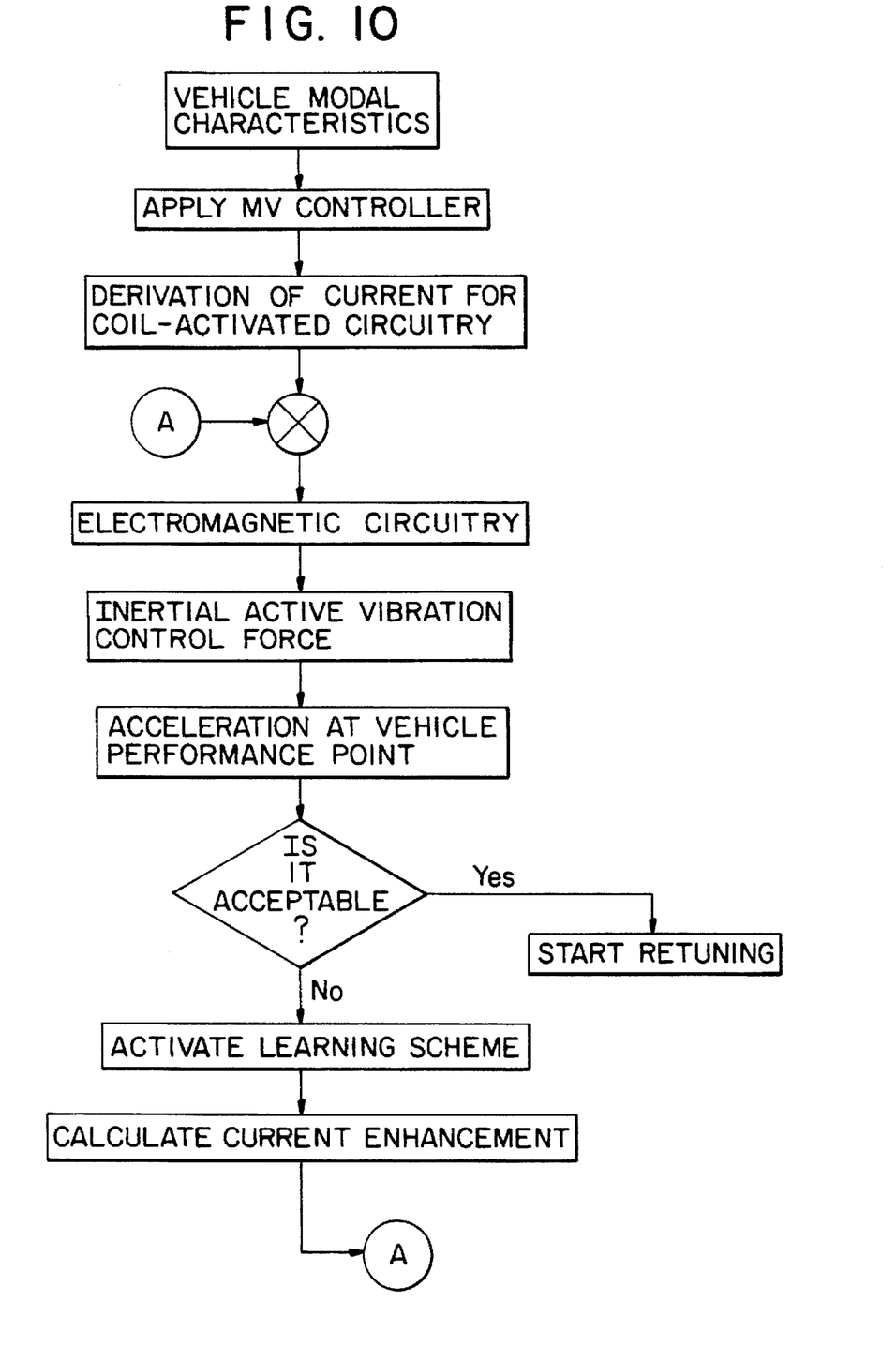
FIG. 10 is a diagram of the system operation.

Thus, from time domain data it is possible to extract structural modes as shown in FIG. 8. It is assumed that the structure consists of N modes, where N is initially unknown. So long as the feedback signal contains modes, the modal extractor identifies new modes, operating in the least square sense.

To prevent generation of an error sequence that is autocorrelated with non-zero mean, a filter is added to the model, on the equation error. This filter, whose parameters are initially unknown, serves to bring the residual bias to zero and to minimize its autocorrelation properties. Thus the system output, predicted by the composition of extracted modes can be represented by $$\hat{y}(t) = \frac{B(q^{-1})}{A(q^{-1})} u(t-\tau) + \frac{C(q^{-1})}{D(q^{-1})} \zeta(t) \quad (5)$$

where B/A represents those modes already identified, and the second term represents potential modes still imbedded in the measurement signal, e.g. a seat track accelerometer. In a simplified case, the above equation is put into the following form for inclusion in the modal extraction algorithm (6)

$$\hat{y}(t) = b_1 u(t-1) + b_1 d_1 u(t-2) + (c_1-d_1)\hat{y}(t-1) + a_1(c_1-d_1)\hat{y}(t-2) + a_2(c_1-d_1)\hat{y}(t-3) - (a_1+c_1)\hat{y}(t-1) - (a_2+a_1c_1)\hat{y}(t-2) - a_2c_1\hat{y}(t-3)$$

To find the unknown parameters, $a_i$, $b_i$, $c_i$, and $d_i$ a constraint optimization problem in the following form is developed.

$$J(\theta) = \sum_{t=1}^{N} [y(t) - \hat{y}(t)]^2 \quad (7)$$

$$\theta = [b_1, b_2, \ldots, a_1, a_2, \ldots, c_1, c_2, \ldots, d_1, d_2, \ldots]$$

Using constraint optimization methods, an algorithm is developed to obtain $\theta$ and consequently the modal parameters of the structure.

The resulting optimization problem becomes one of minimizing $J(\theta)$ subject to the inequality constraints, which translates into Kuhn-Tucker constraint qualifications. Namely, it results in the following equations:

$$\frac{\partial J(\theta^*)}{\partial \theta_j} + \Sigma \mu_i \frac{\partial f_i(\theta^*)}{\partial \theta_j} = 0 \quad j=1,2,\ldots,N$$
$$i=1,2,\ldots,N$$

The vector form of the Newton-Raphson technique for solving nonlinear equations is applied to obtain the system modal parameters. In the developed software, that is stored in the ROM, the lower-upper (LU) factorization technique is used for inverting the Hassian matrix during iteration to avoid "divide by zero" problems.

GENERALIZED MINIMUM VARIANCE OPTIMAL CONTROL

The generalized minimum variance controller is especially suitable for the problems of active vibration and active noise control. This form of control always tends to minimize variations of a given signal, e.g. acceleration of a steering column, from a nominal level of no vibration or zero acceleration.

In every active noise or vibration control system, an estimation of the performance signal, in the described example steering column vibration, is required in order to estimate the level of control effort that should be introduced by the actuator, in this case an active engine mount. Therefore, some form of signal estimation or system identification is required. In general the following can be stated $$y(t) = \frac{B(q^{-1})}{A(q^{-1})} u(t-\tau_1) + \frac{C(q^{-1})}{D(q^{-1})} \zeta(t) \quad (9)$$

where
y(t)=performance signal at time T
u(t-t$_1$)=control signal from actuator
t$_1$=time delay caused by the propagation time from the actuator to the performance signal sensor
$\zeta$(t)=random input (e.g. road vibration)
$A(q^{-1}) = 1 + a_1 q^{-1} + a_2 q^{-2} + \ldots + a_n q^{-n}$
$q^{-1}$=backward shift operator, e.g. $q^{-1}x(t)=x(t-1)$
The $B(q^{-1})$, $C(q^{-1})$ and $D(q^{-1})$ are also polynomials in terms of $q^{-1}$, similar to the $A(q^{-1})$. Depending whether all or some of these four polynomials are considered, the IIR, FIR, ARMA, or ARMAX representation of the system would be the result.

A major departure between the technique used in this invention and prior art systems is based on this signal or system representation. As described above, in accordance with the present invention all four polynomials exist whereas in prior art systems one or more of them are assumed to be zero. Also, in the present invention it is assumed $\zeta$(t) is a Gaussian random signal, whereas prior art techniques may or may not consider $\zeta$(t), and if considered it is assumed to be white noise.

In terms of mathematical derivations, the present invention has two major improvements over the prior art formulation, such as described in the Doelman paper. First, instead of using an ARMA or ARMAX model of the structure, the present system uses the modal representation that has been developed for the structure. Also, due to hardware ability, the optimal control structure of the present invention is based on a quadratic weighted sum of both acoustic (e.g. microphone signals) and vibration (e.g. accelerometer) signals.

In order to derive a minimum variance control, a cost function must be defined. In general, it is desired to minimize the square of variations over time, while restricting the total actuator power, namely $$\text{Cost Function} = J = E\{[Py(t+\tau_1) + Qu(t)]^2\} \quad (10)$$

where E[·] denotes the expected value of a stochastic signal, and P and Q are the weighting factors penalizing excessive variance on y or excessive actuator input u(t). A special case of this cost function is when Q=0, i.e. no restriction is applied to the actuator input. Thus, the cost function $$J = E\{[y(t+\tau_1)]^2\} \quad (11)$$

is less attractive than the cost function defined above, because the former provides the flexibility of trading off performance versus control effort. For example, in the case of applying active vibration control to a vehicle, geometrical restrictions of the actuator in the form of constraint output power may be enforced. The cost function first stated above provides the ability to analytically determine the optimum actuator, whereas the special case cost function requires extensive trial and error. This is another major difference between the present invention and prior art. The technique described herein provides a general solution, while previous techniques have developed special cases of methodology.

In application to motor driven vehicles, the present invention employs both feedforward and feedback. The feedback action reduces effects of repetitive disturbances, e.g. engine vibration, whereas the feedforward loop reduces the effect of random (broadband) disturbances, e.g. vibration due to irregular road inputs.

INCORPORATION OF LEARNING TECHNIQUES

In addition to the generalized version of the control technique provided by this invention, an additional novel feature is provided by incorporating learning ability into the system. This provides better usage of sensory information available to the active or semi-active controller. This technique utilizes past performance to improve future actions, and in addition, to simplify the amount of on-line computations, it applies fuzzy logic to compensate quantitatively for unexpected loads and/or disturbances. A few simple "if—then" rules incorporate fuzzy logic into the system. Thus, the proposed controller has two levels of intelligence:

i. learning based on past performance $$u(i) = u(i - T) + \alpha_1 \frac{u(i-T) - 2u(i-2T) + u(i-3T)}{2T} + \alpha_2 u(i-T) \cdot T \quad (12)$$

where T is the learning sample, and $\alpha_1$ and $\alpha_2$ are learning gains. Therefore, the control signal to an actuator (e.g. active engine mounts) will be improved through its subsequent interactions, thus improving the system performance continuously.

ii. fuzzy logic compensation $$u(i)=u(i-T)+\beta_1 y(i-1)+\beta_2[y(i-1)-y(i-2)] \quad (13)$$

where $\beta_1$ and $\beta_2$ are fuzzy compensator gains, derived from a small set of rules that are fixed based on the level of activities of the described error signals and their derivatives.

While the methods herein described, and the form of apparatus for carrying these methods into effect, constitute preferred embodiments of this invention, it is to be understood that the invention is not limited to these precise methods and form of apparatus, and that changes may be made in either without departing from the scope of the invention, which is defined in the appended claims.

What is claimed is:

1. The method of controlling and attenuating vibration or noise in a structure, such as an automotive vehicle, where the vibration is induced by vibration excitation sources, comprising providing a plurality of sensors for extracting signals related to vibration and/or acoustic noise from the structure and its environs, providing a plurality of actuators for applying attenuating noise and/or vibration to the structure, providing a microprocessor having inputs from the sensors and outputs to the actuators, operating the microprocessor with an optimal control algorithm based on minimum variance, then operating the microprocessor using an intelligent control algorithm, the microprocessor then generating an output signal and applying such signal to the actuators which will minimize and/or filter the vibration or noise introduced to the structure.

2. The method as defined in claim 1 wherein the optimal control step is performed according to the algorithm $$\hat{y}(t)=b_1 u(t-1)+b_1 d_1 u(t-2)+(c_1-d_1)y(t-1)+a_1(c_1-d_1)y(t-2)+a_2(c_1-d_1)y(t-3)-(a_1+c_1)\hat{y}(t-1)-(a_2+a_1 c_1)\hat{y}(t-2)-a_2 c_1 \hat{y}(t-3)$$

where y(t)=performance signal at time T
$u(t-t_1)$=control signal from actuator
$t_1$=time delay caused by the propagation time from the actuator to the performance signal sensor
$\zeta(t)$=random input (e.g. road vibration)
$A(q^{-1})=1+a_1 q^{-1}+a_2 q^{-2}+\ldots+a_n q^{-n}$
$q^{-1}$=backward shift operator.

3. The method of claim 1 wherein the intelligence control step is performed according to the algorithm $$u(i) = u(i - T) + \alpha_1 \frac{u(i-T) - 2u(i-2T) + u(i-3T)}{2T} + \alpha_2 u(i-T) \cdot T$$

where T is the learning sample, and $\alpha_1$ and $\alpha_2$ are learning gains.

4. The method of claim 1 wherein the parameter optimization algorithm is $$u(i) = u(i - T) + \alpha_1 \frac{u(i-T) - 2u(i-2T) + u(i-3T)}{2T} + \alpha_2 u(i-T) \cdot T$$

where T is the learning sample, and $\alpha_1$ and $\alpha_2$ are learning gains, and $$u(i)=u(i-T)+\beta_1 y(i-1)+\beta_2[y(i-1)-y(i-2)]$$

where $\beta_1$ and $\beta_2$ are fuzzy compensator gains.

5. The method of controlling and attenuating vibration or noise induced into an automotive vehicle, comprising providing sensors for extracting signals related to vibration and/or acoustic noise from the structure and its environs and actuators for applying attenuating noise and/or vibration to the structure, providing a microprocessor having inputs from the sensors and outputs to the actuators, and operating the microprocessor cyclically according to an optimal control algorithm based on minimum variance, then an intelligence control algorithm, and then a parameter optimization algorithm, the microprocessor then generating and applying at least one signal to the actuators which will minimize and/or filter the vibration or noise introduced to the vehicle.

6. A system for controlling and attenuating vibration and/or noise in a structure where the vibration is induced by vibration excitation sources and the noise may result directly or indirectly from the vibrations sources, comprising a plurality of sensors attached to different parts of the structure for extracting signals related to vibration and/or acoustic noise from the structure and its environs, a plurality of actuators attached to vibration and/or noise sources on the structure for and capable of applying attenuating noise and/or vibration to such sources, a microprocessor having inputs from said sensors and outputs to said actuators, said microprocessor also having a memory for storage of control programs to be operated by said microprocessor, and a plurality of programs in said memory for use by said microprocessor, said programs including b) an optimal control program based on a minimum variance algorithm, c) a program based on an intelligent control algorithm using stored past performance information, and d) a fourth program based on a fuzzy logic algorithm, the microprocessor running said programs and then generating one or more control signals and applying such signals to said actuators to minimize and/or filter the vibration or noise introduced to the structure.

7. A system for controlling and attenuating vibration and/or noise in a structure, where the vibration is induced by vibration excitation sources internal and external of the structure and the noise may result directly or indirectly from the vibrations sources, comprising sensors attached to parts of the structure for extracting signals related to vibration and/or acoustic noise from the structure and its environs, actuators attached to vibration and/or noise sources on the structure for applying attenuating noise and/or vibration to such sources, a microprocessor having inputs from said sensors and outputs to said actuators, said microprocessor also having a memory for storage of control programs to be operated by said microprocessor, said programs including an optimal control program based on a minimum variance algorithm and also stored in said memory, a program based on an intelligent control algorithm using stored past performance information and also stored in said memory, and a program based on a fuzzy logic algorithm and also stored in said memory, the microprocessor running said programs and then generating one or more control signals and applying such signals to said actuators to minimize and/or filter the vibration or noise according to its effect on components of the structure.

8. A system as defined in claim 7, wherein the optimal control program is based on a minimum variance algorithm as follows:

$$\hat{y}(t) = \frac{B(q^{-1})}{A(q^{-1})} u(t-\tau) + \frac{C(q^{-1})}{D(q^{-1})} \zeta(t)$$

where y(t)=performance signal at time T $u(t-t_1)$=control signal from actuator $t_1$=time delay caused by the propagation time from the $\phi$ actuator to the performance signal sensor $\zeta(t)$=random input (e.g. road vibration)

$A(q^{-1})=1+a_1 q^{-1}+a_2 q^{-2}+\ldots+a_n q^{-n}$, and $q^{-1}$=backward shift operator.

9. A system as defined in claim 8, wherein the intelligence control algorithm is as follows:

$$u(i) = u(i-T) + \alpha_1 \frac{u(i-T) - 2u(i-2T) + u(i-3T)}{2T} + \alpha_2 u(i-T) \cdot T$$

where T is the learning sample, and $\alpha_1$ and $\alpha_2$ are learning gains.

10. A system as defined in claim 9, wherein the fuzzy logic algorithm is as follows:

$$u(i) = u(i-T) + \alpha_1 \frac{u(i-T) - 2u(i-2T) + u(i-3T)}{2T} + \alpha_2 u(i-T) \cdot T$$

where T is the learning sample, and $\alpha_1$ and $\alpha_2$ are learning gains, and $$u(i)=u(i-T)+\beta_1 y(i-1)+\beta_2[y(i-1)-y(i-2)]$$

where $\beta_1$ and $\beta_2$ are fuzzy compensator gains.

* * * * *